US012707269B2

(12) United States Patent
Sun

(10) Patent No.: US 12,707,269 B2
(45) Date of Patent: Aug. 11, 2026

(54) SYSTEMS AND METHODS FOR SECURE PROVISIONING OF DETECTOR UNITS

(71) Applicant: ZEBRA TECHNOLOGIES CORPORATION, Lincolnshire, IL (US)

(72) Inventor: MingHao Sun, Rockville, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 817 days.

(21) Appl. No.: 17/732,045

(22) Filed: Apr. 28, 2022

(65) Prior Publication Data

US 2023/0354035 A1 Nov. 2, 2023

(51) Int. Cl.
*H04W 12/30* (2021.01)
*H04L 9/14* (2006.01)
*H04W 4/80* (2018.01)
*H04W 84/12* (2009.01)

(52) U.S. Cl.
CPC ............... *H04W 12/35* (2021.01); *H04L 9/14* (2013.01); *H04W 4/80* (2018.02); *H04W 84/12* (2013.01)

(58) Field of Classification Search
CPC ............ H04W 12/35; H04W 4/80; H04L 9/14
See application file for complete search history.

(56) References Cited

U.S. PATENT DOCUMENTS 9,154,948 B2 * 10/2015 Khare ................. H04W 12/068
10,938,558 B2 * 3/2021 Bhella ................... H04L 63/123
11,062,245 B2 * 7/2021 Clevenger ............... H04W 4/80
11,257,072 B1 * 2/2022 Aument .................. G07F 7/088
2005/0253722 A1 * 11/2005 Droms ................ H04L 61/4511 340/572.1
2014/0061306 A1 * 3/2014 Wu .................... G06K 7/10386 235/439
2015/0058191 A1 2/2015 Khan et al.
2015/0229475 A1 * 8/2015 Benoit ................ H04W 12/069 713/168
2016/0080364 A1 * 3/2016 Karimzadeh ......... G06F 21/606 726/6
2016/0212509 A1 * 7/2016 Ljung ..................... H04W 4/80
(Continued)

OTHER PUBLICATIONS

Nathan Wallace et al., Passive Real-Time Asset Inventory Tracking and Security Monitoring of Grid-edge Devices, IEEE (Year: 2018).*
(Continued)

*Primary Examiner* — Shanto Abedin

(57) ABSTRACT

Techniques for secure provisioning of a detector unit are provided. An example method includes detecting, via a short-range communication interface, a coupling between a terminal and a detector unit; responsive to the coupling, obtaining, via one or more processors, identification information uniquely identifying the detector unit; transmitting, via a wireless communication network, the identification information to an access server; receiving, via the wireless communication network and from the access server, an access response indicating that the detector unit is an authorized device; and responsive to receiving the access response, provisioning, via the short-range communication interface, the detector unit with configuration information that enables the detector unit to access the wireless communication network.

20 Claims, 6 Drawing Sheets

(56) References Cited

U.S. PATENT DOCUMENTS

| | | | | |
|---|---|---|---|---|
| 2016/0234202 | A1* | 8/2016 | Ahmed | H04W 12/06 |
| 2016/0358172 | A1 | 12/2016 | Zia et al. | |
| 2017/0060237 | A1* | 3/2017 | Pellaton | G08C 17/02 |
| 2017/0111784 | A1* | 4/2017 | Vanover | H04W 60/04 |
| 2019/0109816 | A1 | 4/2019 | Liu et al. | |
| 2019/0147680 | A1* | 5/2019 | Tehranchi | G06F 21/35 340/5.61 |
| 2019/0313246 | A1 | 10/2019 | Nix | |
| 2020/0128395 | A1* | 4/2020 | Mars | H04W 12/71 |
| 2020/0195424 | A1 | 6/2020 | Bhella et al. | |
| 2020/0287937 | A1* | 9/2020 | Weiler | H04L 63/0823 |
| 2021/0211903 | A1 | 7/2021 | Lavi | |

OTHER PUBLICATIONS

Role of Device Identification and Manufacturer Usage Description in IoT Security: A Survey, IEEE Access (Year: 2021).*
International Search Report and Written Opinion for International Application No. PCT/US2023/016714 mailed on Jun. 23, 2023.
Novelty Search Report for Belgian Patent Application No. 2023/5333 mailed on Jan. 3, 2024.

* cited by examiner

SYSTEMS AND METHODS FOR SECURE PROVISIONING OF DETECTOR UNITS

BACKGROUND

In retail or inventory environments, detector units (e.g., barcode scanners, RFID readers) need to connect to a local wireless communication network to perform an inventory management task. For example, the detector unit may be configured to detect identifiers affixed to an object and send reports of detected identifiers over the local wireless communication network for supply chain tracking applications. As with any other communication device, the detector units need to obtain configuration information about the local wireless communication network before connecting thereto.

However, many detector units have rudimentary user interfaces. Thus, configuring the detector unit with the configuration information via the detector unit user interface is often an arduous user experience.

Many types of detector units also include the capability to pair with terminal devices via short range communication links. For example, some detector units may be adapted in a sled configuration in which a terminal device is received into a connector apparatus that includes one or more pins to support short-range communications therebetween. Accordingly, in an attempt to improve the configuration experience, some have enabled the manual configuration of the detector unit via the terminal device user interface.

However, this is still a lengthy manual process that is prone to user error. Additionally, the manual process also lacks the ability to properly authenticate the detector unit prior to configuration. In view of these challenges, there is a need for systems and methods for secure provisioning of detector units.

SUMMARY

In an embodiment, a method for securely provisioning a detector unit is provided. The method includes (1) detecting, via a short-range communication interface, a coupling between a terminal and a detector unit; (2) responsive to the coupling, obtaining, via one or more processors, identification information uniquely identifying the detector unit; (3) transmitting, via a wireless communication network, the identification information to an access server; (4) receiving, via the wireless communication network and from the access server, an access response indicating that the detector unit is an authorized device; and (5) responsive to receiving the access response, provisioning, via the short-range communication interface, the detector unit with configuration information that enables the detector unit to access the wireless communication network.

In another embodiment, another method for securely provisioning a detector unit is provided. The method includes (1) detecting, via a short-range communication interface, a coupling between a terminal and a detector unit; (2) responsive to the coupling, obtaining, via one or more processors, identification information uniquely identifying the detector unit; (3) comparing, by the one or more processors, the identification information to a list of identification information for devices authorized to use a wireless communication network; (4) determining, via the one or more processors, that the detector unit is an authorized device; and (5) responsive to the determination, provisioning, via the short-range communication interface, the detector unit with configuration information that enables the detector unit to access the wireless communication network.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
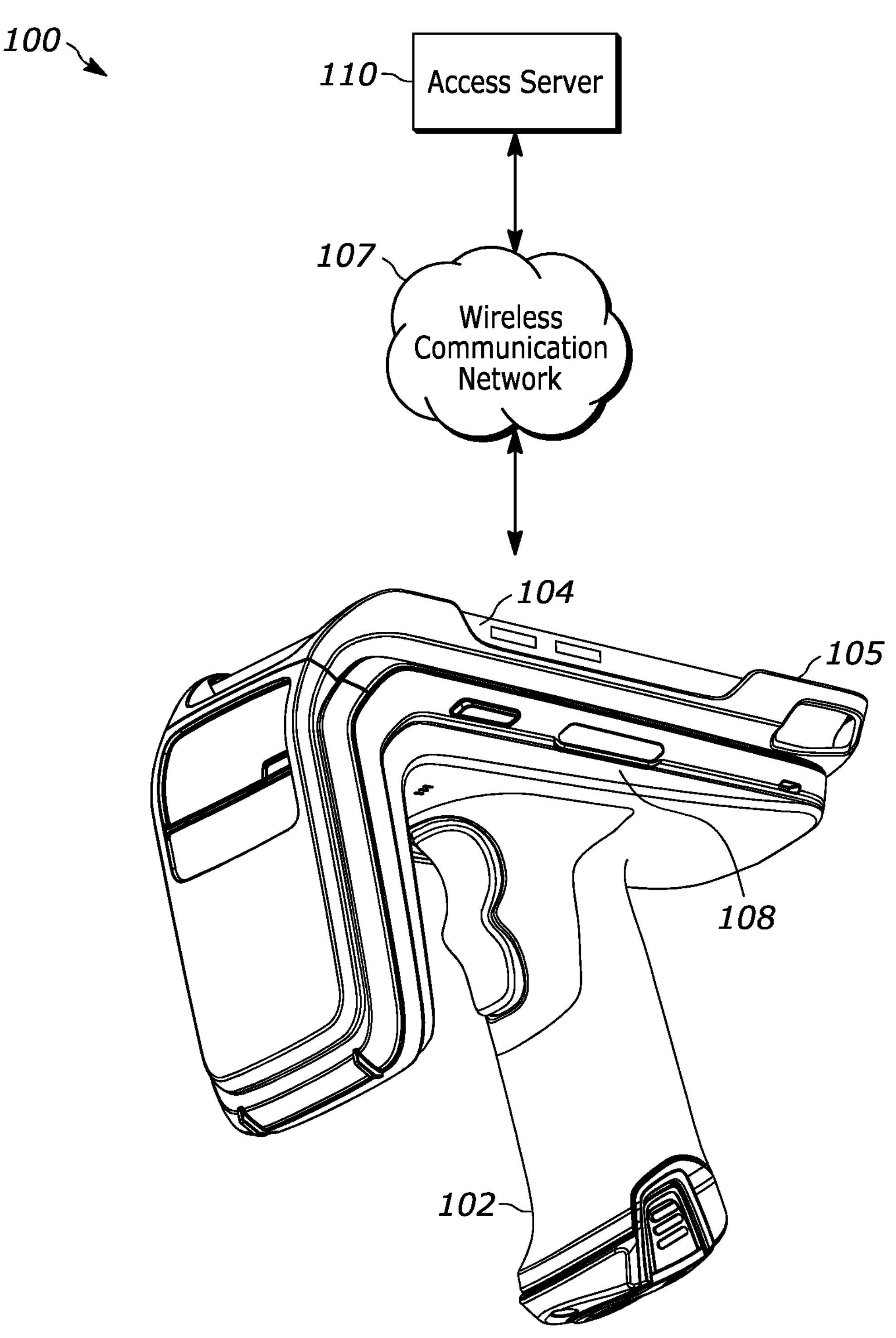
FIG. 1 illustrates an example environment that includes a detector unit coupled to a terminal device, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates an example environment 100 that includes example detector unit 102 and an example mobile computing device terminal 104 attached via a mechanical adapter 105. The techniques provided by the present disclosure involve securely provisioning the detector unit 102 via a short-range communication interface between the mobile computing device terminal 104 and the detector unit 102. While FIG. 1 depicts the detector unit 102 in a radio frequency (RF) identification (RFID) sled form factor, in other embodiments, the detector unit 102 is a standalone RFID detector unit. Similarly, in other embodiments, the detector unit 102 is a barcode detector unit configured to scan barcodes, direct part marking (DPM) codes, and the like.

In the illustrated embodiment, the adapter 105 includes an array of general purpose input/output (GPIO) pins that establish a physical communication coupling between the detector unit 102 and the terminal 104 when the adapter 105 is coupled to the terminal 104. In some embodiments, the terminal 104 and the detector unit 102 additionally or alternatively establish a short-range wireless communication link therebetween. For example, the short-range wireless communication link may be a Bluetooth (including Bluetooth low energy (BLE)) communication link, a near field communication (NFC), and/or another type of short-range wireless communication link. Accordingly, the terminal 104 and the detector unit 102 may establish the short-range communication interface via a physical communication coupling and/or the short-range wireless communication link.

While FIG. 1 depicts the terminal 104 in a mobile computing device form factor that can be received into the sled form factor of the detector unit 102, in other embodiments the terminal 104 takes other form factors, such as a desktop computer, a laptop, a tablet, a mobile computing device not adapted for reception into the sled form factor of the detector unit 102, or other types of user equipment form factors. To support establishing the short-range communication interface with these alternate types of terminals 104, the detector unit includes a port 108, such as a serial port, a universal serial bus (USB) port, an Ethernet port, or other types of ports. If the alternate terminals 104 also supports one or more types of short-range wireless communication links, the short-range communication interface between the detector unit 102 and the terminal 104 may additionally or alternatively be established via the short-range wireless communication link.

In addition to the short-range communication interface, the detector unit 102 also includes one or more transceivers adapted to communicate over a wireless communication network 107 associated with a venue, such as a warehouse, a loading dock, a port, a retail or other commercial location, etc. For example, the wireless communication network 107 may be a Wi-Fi communication network or a cellular communication network. It should be appreciated that when a venue operator first obtains a detector unit 102, the detector unit 102 is typically not configured with the necessary configuration information required to communicate over the wireless communication network 107. For example, many wireless communication networks require a password and/or a security credential to be authenticated onto the network. Accordingly, prior to using the detector unit 102 for its detection functionality, venue operators typically need to configure the detector unit 102 with the appropriate configuration information.

As illustrated, the example environment 100 also includes an access server 110 configured to authenticate and/or authorize devices, such as the detector unit 102, with the wireless communication network. It should be appreciated that while FIG. 1 shows the terminal 104 and the detector unit 102 in direct communication with the access server 110, in some embodiments, one or more components are logically disposed therebetween (e.g., an access point, a firewall, an edge router, etc.). The access server 110 may be configured to maintain a list of devices authorized to access the wireless communication network 107. Entries in the list may include one or more identifiers that uniquely identify the devices and one or more entitlements (e.g., basic usage, data limits, etc.) the device is permitted with respect to the wireless communication network 107. That is, if a device is permitted to access wireless communication network, the list will include a unique device identifier (e.g., a MAC address, a serial number, a UICCID, etc.) and an indication of the entitlement for network access.

In one scenario, a venue operator places a bulk order for a plurality of detector units 102. As part of fulfilling the order, the detector unit supplier provides the venue operator a list of the unique device identifiers corresponding to the detector units 102 to be delivered to the venue. In response, the venue operator may configure the list maintained at the access server 110 to include the unique device identifiers provided by the supplier and the corresponding entitlements. As a result, unauthorized detector units 102, including detector units 102 that may otherwise be authorized for usage at other venues, do not have an entitlement to utilize the wireless communication network 107. As such, the access server 110 will block a network registration attempt associated with the unauthorized detector units 102.

Additionally, to improve network security for the wireless communication network 107, in some embodiments the access server 110 implements authentication techniques with respect to the devices seeking network authorization. For example, in some embodiments, each detector unit 102 corresponds to a public/private key pair. In these embodiments, the detector unit 102 stores the private key of the public/private key pair in a memory. Additionally, in these embodiments, the access server 110 stores the corresponding public key of the public/private key pair. In one example, when the detector unit supplier provides the list of unique device identifiers, the list also includes the public key that corresponds to the unique device identifier. Accordingly, records in the list of authorized devices maintained at the access server 110 may also include the public key corresponding to the device.

In these embodiments, the detector unit 102 may be configured to apply a digital signature to a network registration request. In one example, a digital signature is a predetermined string of characters that is encrypted using the private key stored at the detector unit 102. Accordingly, when the digital signature is routed to the access server 110 during the device authentication process, the access server 110 uses the unique device identifier included in the registration request to identify the corresponding public key to apply to the digital signature. If the access server is able to decrypt digital signature and identified the predetermined string of characters, then the detector unit 102 is authenticated as the device that corresponds to the unique device identifier. On the other hand, if the application of the public key does not result in the predetermined string of characters, the access server 110 may reject the registration attempt due to the registration failing the authentication check. As a result, even if a malefactor were to manipulate an unauthorized detector unit 102 to spoof an authorized detector unit 102 by using the unique device identifier corresponding to the authorized detector unit 102, the access server 110 will still reject the registration request.

In some embodiments, network registration is performed locally by the terminal 104 in tandem with the access 104. In these embodiments, the access server 104 may expose the list of unique device identifiers, entitlements, and/or public keys to an application executing on the terminal 104. Accordingly, the terminal 104 may include a local copy of the list. In these embodiments, the access sever 110 may push any updates to the list out to the terminal 104 to synchronize the changes.

Figure 2A:
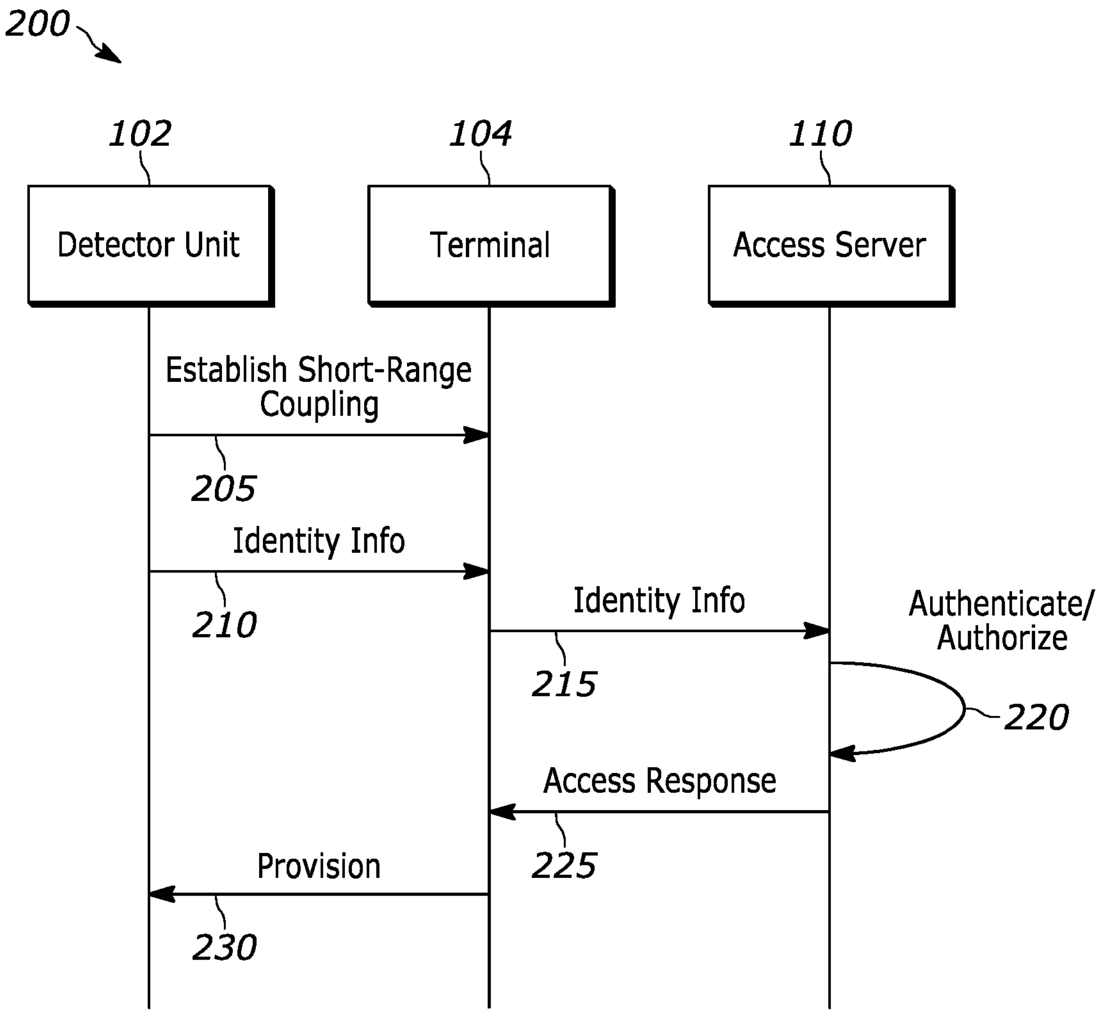
FIG. 2A illustrates an example signal diagram for securely provisioning a detector unit via a central authority, in accordance with some examples.
Figure 2B:
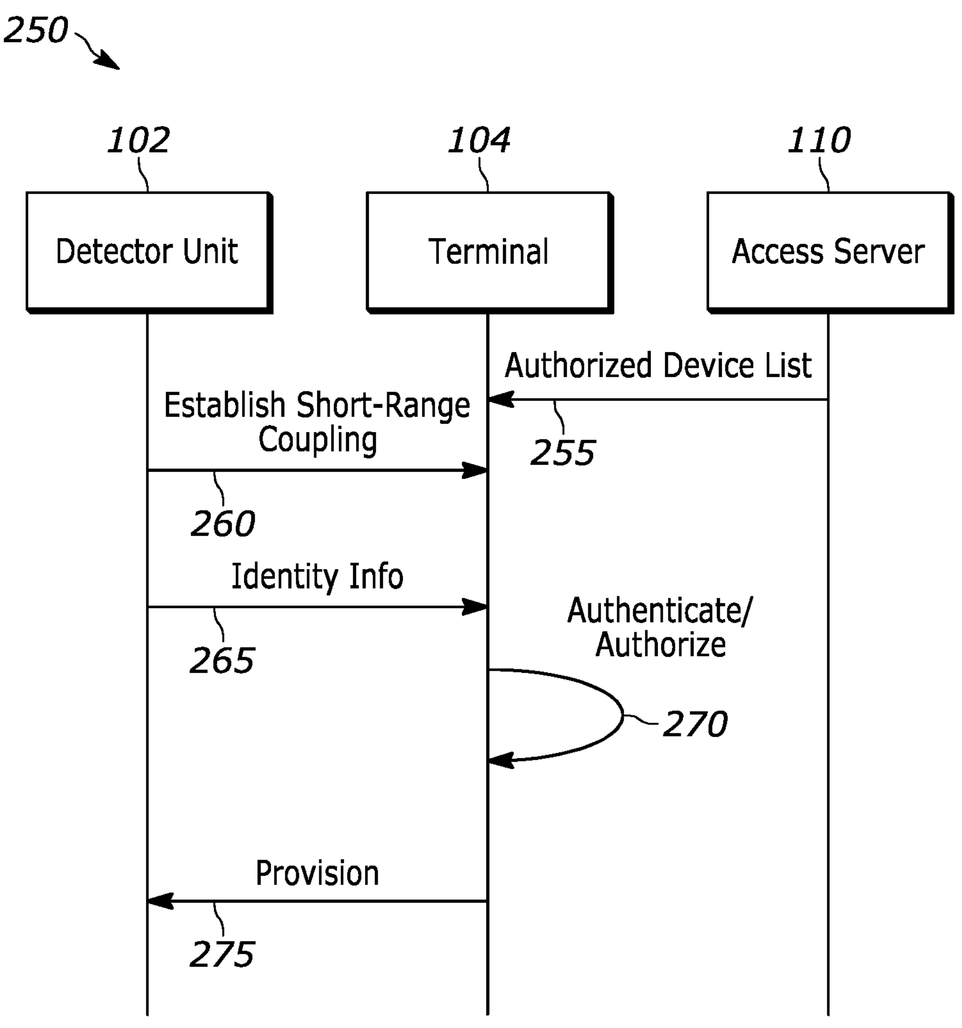
FIG. 2B illustrates an example signal diagram for securely provisioning a detector unit via a local authority, in accordance with some examples.

FIGS. 2A, 2B depict signal diagrams representative of two different techniques to register the detector unit 102 onto the wireless communication network 107. The signal diagram 200 of FIG. 2A depicts a first technique for securely provisioning the detector unit 102 via a central authority (e.g., the access server 110). The signal diagram 250 of FIG. 2B depicts a second technique for securely provisioning the detector unit 102 via a local authority (e.g., the terminal 104). The actions described with respect to the signal diagrams 200, 250 are performed by the detector unit 102, the terminal 104, and the access server 110.

The example signal diagram 200 begins when the detector unit 102 and the terminal 104 establish (205) a short-range coupling therebetween. In one example, the short-range coupling is the short-range communication interface described with respect to FIG. 1. In response thereto, the detector unit 102 may determine whether or not the detector unit 102 is able to connect to the wireless communication network 107. If the detector unit 102 is not able to connect, the detector unit 102 may initiate a network registration attempt for the wireless communication network 107.

As part of the network registration attempt, the detector unit 102 may transmit (210) a registration request to the terminal 104 via the short-range communication interface. The registration request includes a unique device identifier of the detector unit 102 that is used for authentication. In some embodiments, the detector unit 102 applies a digital signature to the registration request that is encrypted using a private key of a public/private key pair stored in a memory of the detector unit 102.

The terminal 104 then routes (215) the registration attempt to the access server 110 for processing. In some embodiments, the terminal 104 routes the registration attempt over the wireless communication network 107. In other embodiments, the terminal 104 routes the registration attempt to the access server 110 via an alternate communication connection (e.g., an Ethernet connection).

The access server then processes (220) the registration request to authenticate and/or authorize the detector unit 102. With respect to the authorization, the access server 110 may utilize the unique device identifier included in the registration request to query the list of authorized devices. If the unique device identifier corresponds to an entitlement for accessing the wireless communication network 107, the access server 110 authorizes the detector unit 102 in accordance therewith. If there is a firewall or other security node for the wireless communication network 107, the access server 110 may communicate with the security node to perform the necessary configurations needed to permit the detector unit 102 onto the wireless communication network 107. For example, the security node may be configured to generate a security certificate for the detector unit 102 to use when accessing the wireless network 107.

With respect to authentication, the access server 110 may verify the digital signature applied to the registration request. Accordingly, the access server 110 may use the identity information included in the registration request to obtain a public key that corresponds to the indicated identity information. If the access server 110 is able to successfully decrypt the digital signature using the public key, the access server 110 may authenticate the detector unit 102. On the other hand, if the access server 110 is unable to decrypt the digital signature using the public key, the access server 110 may indicate that the detector unit 102 failed authentication.

The access server 225 then transmits (225) an access response to the terminal 104. If the access server 110 determined that the detector unit 102 was nots authenticated and/or authorized to utilize the wireless communication network 107, the access response may indicate the corresponding failure type. Otherwise, the access server 110 formats the access response to indicate the successful authentication and/or authorization of the detector unit 102. If the wireless communication network 107 requires a security certificate, the access response may include the security certificate. The terminal 104 may then relay the access response to the detector unit 102.

If the terminal 104 received a successful access response, the terminal 104 then provisions (230) the detector unit 102 with configuration information to access to the wireless communication network 107. For example, the terminal 104 may configure the detector unit 102 to include the SSID and password associated with the wireless communication network 107. If the wireless communication network 107 requires a security certificate, the terminal 104 may provision the received security certificate into the detector unit 102. After the configuration, the detector unit 102 is able to directly access the wireless communication network 107 without using the terminal 104 as an intermediary. Accordingly, the detector unit 102 may transmit a new registration request for the wireless communication network 107 to establish the independent network access.

In some embodiments, upon connecting to the wireless communication network 107, the detector unit 102 performs a software update check to determine whether a software update is needed for the detector unit 102 (or any module thereof). For example, the software update may include additional security features, correct newly-discovered security flaws, or provide other updates to the operation of the detector unit 102. Accordingly, if there are any pending software updates for the detector unit 102, the detector unit 102 may download and install the software updates.

Turning now to the example signal diagram 250 for performing the authorization and/or authentication at the terminal 104, the example signal diagram 250 begins when the access server 110 transmits (255) the list of authorized devices for the wireless communication network 107 to the terminal 104. As described above, the list may include a correspondence between unique device identifiers, entitlements for the wireless communication network 107, and/or a public key. In some embodiments, the access server 110 pushes the list out to a plurality of terminals 104 when the list is updated. In other embodiments, an application executing on the terminal 104 issues a request for the access server 110 to send a current version of the list. For example, the application may periodically request the update or request the update in response to a user interaction with the terminal 104. If the terminal 104 already includes the latest version of the list, the access server 110 may indicate this fact instead of transmitting a duplicate copy of the list.

The terminal 104 may then establish (260) a short-range coupling with the detector unit 102. In response to establishing the short-range coupling, the detector unit 102 may transmit (265) identity information, such as a unique device identifier, to the terminal 104. This actions associated with the steps 260, 265 may be substantially similar to those performed at the steps 205, 210 of the example signal diagram 200.

The terminal 104 then analyzes (270) the identity information to authenticate and/or authorize the detector unit 102 with the wireless communication network 107. The terminal 104 may perform an analysis substantially similar the analysis performed by the access server 110 described with respect to the step 220 of the example signal diagram 200. In some embodiments, the terminal 104 may additionally inform the access server 110 regarding a successful authentication and/or authorization of the detector unit 102 so as to initiate any back-end processing to accept a subsequent registration request directly from the detector unit 102. This may include communicating with a security node to generate a security certificate for the detector unit 102.

In response to a successful authentication and/or authorization, the terminal 104 then provisions (275) the detector unit with the configuration information required to access the wireless communication network 107. This may involve substantially similar actions to those described with respect to the step 230 of the example signal diagram 200.

Figure 3:
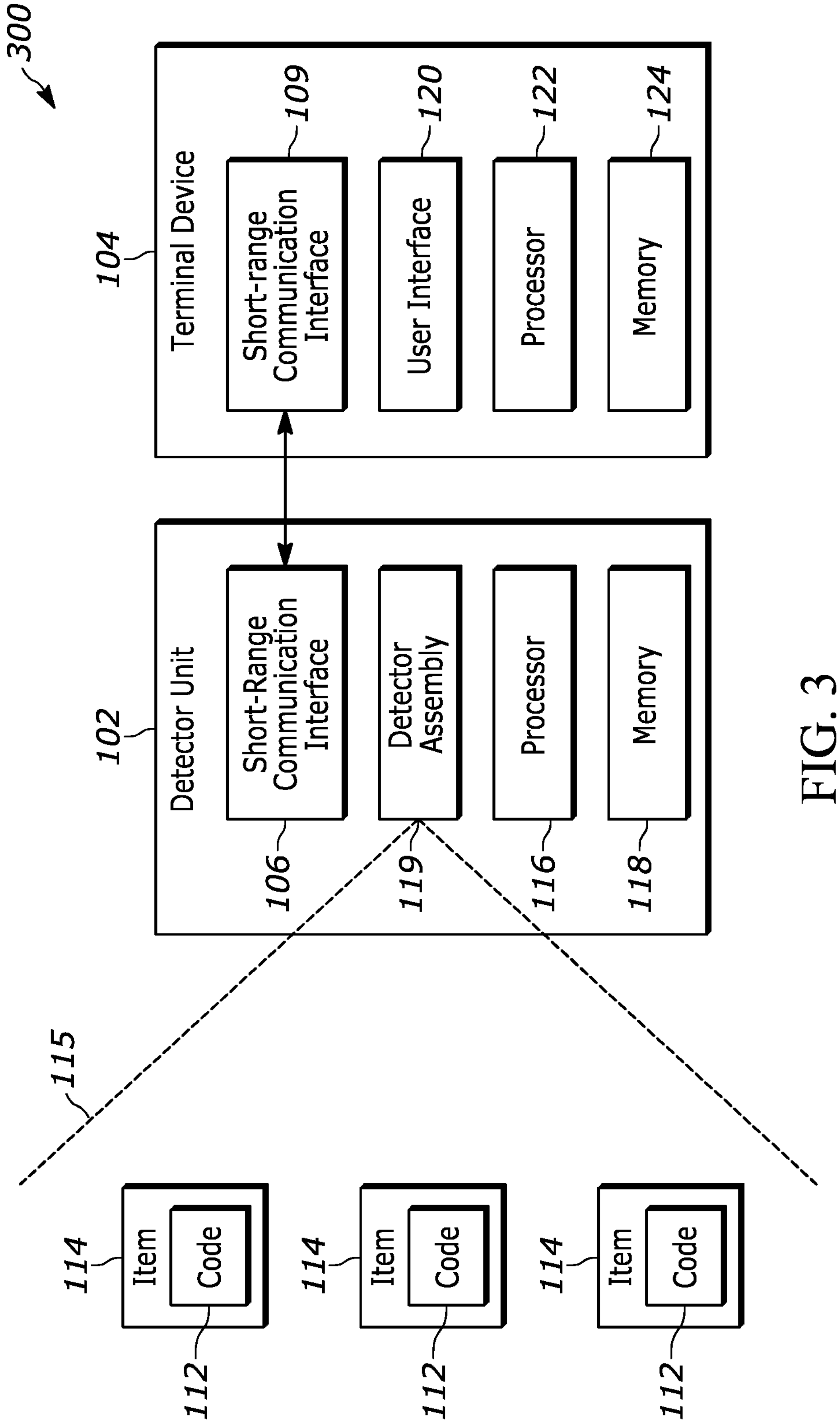
FIG. 3 illustrates a block diagram of an example system including a logic circuit for implementing the example methods and/or operations described herein, including methods for securely provisioning a detector unit.

FIG. 3 illustrates a block diagram of an example system 300 including a logic circuit for implementing the example methods and/or operations described herein, including methods for wireless detection of a terminal to a sled attachment. The system 300 may include a detector unit (e.g., an RFID reader sled attachment device as discussed above) 102, and a terminal device 104, configured to communicate with one another via respective short-range communication interfaces 106, 109. The short-range communication interface 106 of the detector unit 102 may include transmitters, receivers, transceivers, etc., and may be configured to send and/or receive short-range wireless communication signals (e.g., Bluetooth® signals, Zigbee® signals, infrared signals, USB signals, serial signal, Ethernet signal etc.) to and from the short-range communication interface 109 of the terminal device 104, and the short range communication interface 109 of the terminal device 104 may include transmitters, receivers, transceivers, etc., and may be configured to send and/or receive short-range wireless communication signals to and from the short-range communication interface 106 of the detector unit 102.

The terminal device 104 may include a user interface 120 via which the terminal device 104 may display information to users and/or receive input from users, e.g., regarding the detector unit 102, items 114 and/or codes 112. Moreover, the terminal device 104 may include one or more processors 122 and a memory 124 (e.g., volatile memory, non-volatile memory) accessible by the one or more processors 122 (e.g., via a memory controller). The one or more processors 122 may interact with the memory 124 to obtain, for example, computer-readable instructions stored in the memory 124. The computer-readable instructions stored in the memory 124 may cause the one or more processors 122 to establish a short-range communication link with the detector unit 102 via the short-range communication interfaces 106, 109. The computer-readable instructions stored in the memory 124 may further cause the one or more processors 122 to continue to authorize and/or authenticate the detector unit 102 with the wireless communication network 107. In some embodiments, the memory 124 also stores a list of authorized devices to use while authorizing and/or authenticating the detector unit 102. Furthermore, the computer-readable instructions stored in the memory 124 may further cause the one or more processors 122 to provision the detector unit 102 to access the wireless communication network 107 upon successful authorization and/or authentication. Additionally, the computer-readable instructions stored on the memory 124 may include instructions for carrying out any of the steps of the methods 400, 500, described in greater detail below with respect to FIGS. 4 and 5, respectively.

The detector unit 102 may further include a detector assembly 119 configured to detect indications of codes 112 associated with items 114 within a range 115, e.g., in a retail or inventor environment. In an embodiment where the detector unit 102 is an RFID reader, the codes 112 are stored in RFID tags affixed to the items 114. In an embodiment where the detector unit 102 is a barcode reader, the codes 112 are encoded by barcodes affixed to the items 114. Moreover, the detector unit 102 may include one or more processors 116 and a memory 118 (e.g., volatile memory, non-volatile memory) accessible by the one or more processors 116 (e.g., via a memory controller). The one or more processors 116 may interact with the memory 118 to obtain, for example, computer-readable instructions stored in the memory 118. The computer-readable instructions stored in the memory 118 may cause the one or more processors 116 to detect a communicative coupling via the short range communication interfaces 106, 109 and establish a communication link therewith. The computer-readable instructions stored in the memory 118 may further cause the one or more processors 116 to communicate over the wireless communication network 107 after being configured by the terminal device 104. Furthermore, the memory 118 may store a device identifier and/or a private key of a public/private key pair uniquely corresponding to the detector unit 102.

Figure 4:
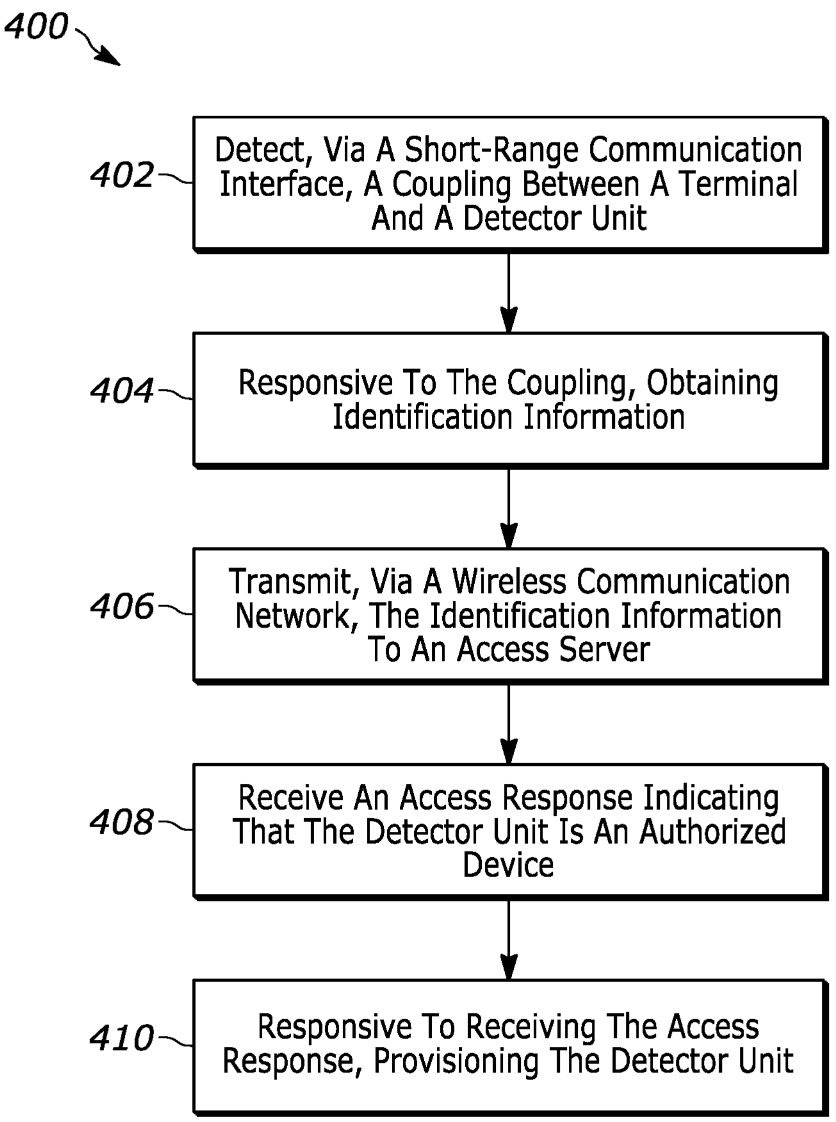
FIGS. 4 and 5 illustrate block diagrams of example processes as may be implemented by the system of FIG. 3, for implementing example methods and/or operations described herein, including methods for securely provisioning a detector unit.

FIG. 4 illustrates a block diagram of an example method 400 as may be implemented by the system 300 of FIG. 3, for implementing example methods and/or operations described herein, including methods for securely provisioning a detector unit. One or more steps of the method 400 may be implemented as a set of instructions stored on a computer-readable memory (e.g., memory 124 of the terminal 104) and executable on one or more processors (e.g., processors 122 of the terminal 104).

At block 402, the terminal detects, via a short-range communication interface, a coupling between a terminal and a detector unit. In some embodiments, the detector unit is at least one of a barcode scanner and radio frequency identification (RFID) reader.

At block 404, responsive to the coupling, the terminal obtains identification information uniquely identifying the detector unit the terminal. In some embodiments, the identification information uniquely identifying the detector unit is at least one of a serial number and a media access control (MAC) address. Additionally or alternatively, in some embodiments, the detector unit is associated with a unique public key/private key pair. Accordingly, in these embodiments, the identification information uniquely identifying the detector unit includes a digital signature applied encrypted via the private key.

At block 406, the terminal transmits, via the wireless communication network, the identification information to an access server. In some embodiments, communications via the short-range communication interface utilize a different communication protocol than communications over the wireless communication network. For example, in some embodiments, the short-range communication interface is at least one of a Bluetooth interface, a universal serial bus (USB) interface, a serial interface, an Ethernet interface, a near field communication (NFC) interface, or a general purpose input/output (GPIO) interface. On the other hand, in some embodiments, the wireless communication network is at least one of a wireless fidelity (Wi-Fi) network and a cellular network. For example, in some embodiments, the wireless communication network is configured as a secure local area network (LAN).

At block 408, the terminal receives, via the wireless communication network and from the access server, an access response indicating that the detector unit is an authorized device. In some embodiments, to determine the access response, the access server is configured to compare at least one of the serial number and the MAC address to a list of approved serial numbers or MAC addresses. Additionally or alternatively, in embodiments where the detector unit is associated with a public key/private key pair, to determine the access response, the access server is configured to decrypt the digital signature using the public key.

At block 410, responsive to receiving the access response, the terminal provisions, via the short-range communication interface, the detector unit with configuration information that enables the detector unit to access the wireless communication network. In some embodiments, the configuration information includes at least one of a network name for the wireless communication network, a network password for the wireless communication network, or a software update for the detector unit. In embodiments where the wireless communication network is configured as a secure LAN, the configuration information includes a security certificate to authenticate with the secure LAN.

Figure 5:
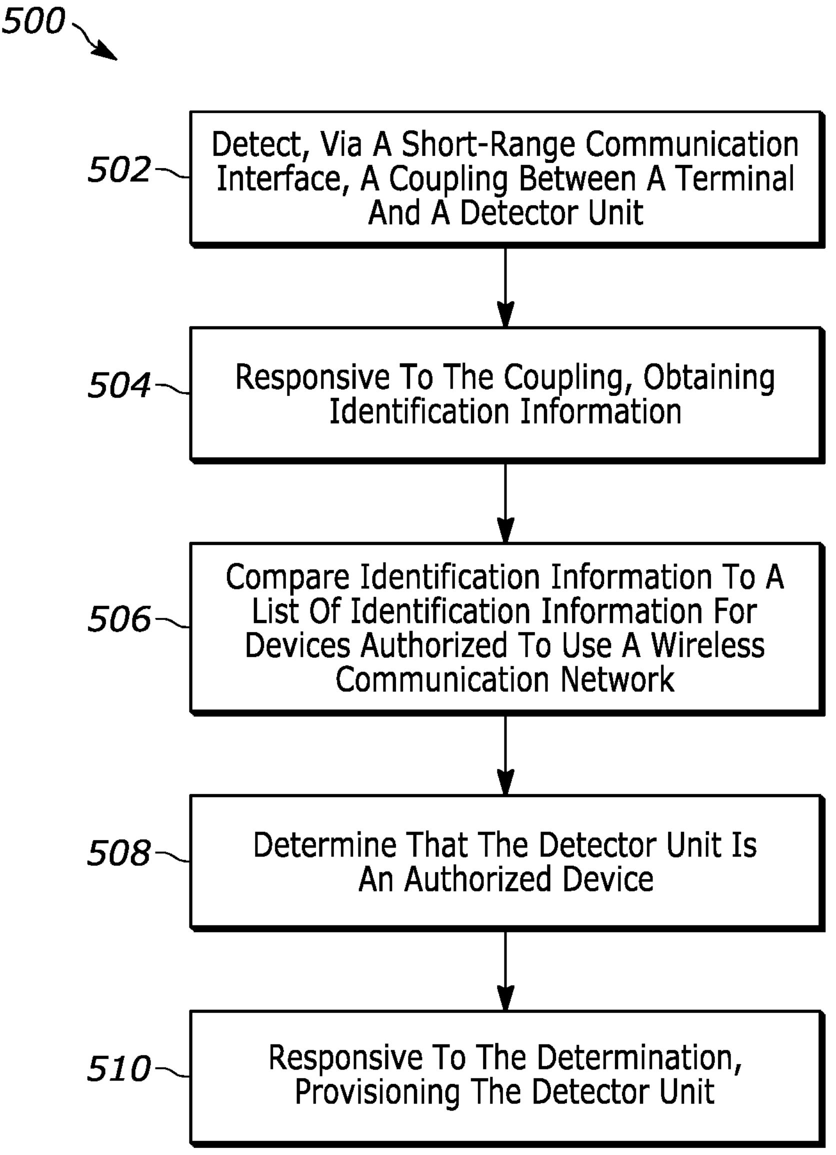

FIG. 5 illustrates a block diagram of an example method 500 as may be implemented by the system 300 of FIG. 3, for implementing example methods and/or operations described herein, including methods for securely provisioning a detector unit. One or more steps of the method 500 may be implemented as a set of instructions stored on a computer-readable memory (e.g., memory 124 of the terminal 104) and executable on one or more processors (e.g., processors 122 of the terminal 104).

At block 502, the terminal detects, via a short-range communication interface, a coupling between a terminal and a detector unit. In some embodiments, the detector unit is at least one of a barcode scanner and radio frequency identification (RFID) reader.

At block 504, responsive to the coupling, the terminal obtains, via one or more processors, identification information uniquely identifying the detector unit. In some embodiments, the identification information uniquely identifying the detector unit is at least one of a serial number and a media access control (MAC) address. Additionally or alternatively, in some embodiments, the detector unit is associated with a unique public key/private key pair. Accordingly, in these embodiments, the identification information uniquely identifying the detector unit includes a digital signature applied encrypted via the private key.

At block 506, the terminal compares, by the one or more processors, the identification information to a list of identification information for devices authorized to use a wireless communication network. In some embodiments, the terminal is configured to obtain, from an access server, the list of identification information. In embodiments where the identification information is at least one of a serial number and a MAC address, the list of identification information includes a list of approved serial numbers or MAC addresses.

In some embodiments, communications via the short-range communication interface utilize a different communication protocol than communications over the wireless communication network. For example, in some embodiments, the short-range communication interface is at least one of a Bluetooth interface, a universal serial bus (USB) interface, a serial interface, an Ethernet interface, a near field communication (NFC) interface, or a general purpose input/output (GPIO) interface. On the other hand, in some embodiments, the wireless communication network is at least one of a wireless fidelity (Wi-Fi) network and a cellular network. For example, in some embodiments, the wireless communication network is configured as a secure local area network (LAN).

At block 508, the terminal determines, via the one or more processors, that the detector unit is an authorized device. In some embodiments, to determine the access response, the terminal compares at least one of the serial number and the MAC address to the list of approved serial numbers or MAC addresses. Additionally or alternatively, in embodiments where the detector unit is associated with a public key/private key pair, to determine the access response, the terminal decrypts the digital signature using the public key.

At block 510, responsive to the determination, the terminal provisions, via the short-range communication interface, the detector unit with configuration information that enables the detector unit to access the wireless communication network. In some embodiments, the configuration information includes at least one of a network name for the wireless communication network, a network password for the wireless communication network, or a software update for the detector unit. In embodiments where the wireless communication network is configured as a secure LAN, the configuration information includes a security certificate to authenticate with the secure LAN.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for securely provisioning a detector unit, the method comprising:

detecting, via a short-range communication interface, a coupling between a mobile computing device terminal and a detector unit, the mobile computing device terminal being attachable to the detector unit via a mechanical adapter coupled to the detector unit such that a top surface of the detector unit is adjacent to a bottom surface of the mechanical adapter and a top surface of the mechanical adapter is adjacent to a bottom surface of the mobile computing device terminal;

responsive to the coupling, obtaining, via one or more processors, identification information uniquely identifying the detector unit;

transmitting, via a wireless communication network, the identification information to an access server;

receiving, via the wireless communication network and from the access server, an access response indicating that the detector unit is an authorized device; and responsive to receiving the access response, provisioning, via the short-range communication interface, the detector unit with configuration information that enables the detector unit to access the wireless communication network.

2. The method of claim 1, wherein communications via the short-range communication interface utilize a different communication protocol than communications over the wireless communication network.

3. The method of claim 1, wherein:

the identification information uniquely identifying the detector unit is at least one of a serial number and a media access control (MAC) address; and to determine the access response, the access server is configured to compare at least one of the serial number and the MAC address to a list of approved serial numbers or MAC addresses.

4. The method of claim 1, wherein:

the detector unit is associated with a unique public key/private key pair;

the identification information uniquely identifying the detector unit includes a digital signature applied encrypted via the private key; and to determine the access response, the access server is configured to decrypt the digital signature using the public key.

5. The method of claim 1, wherein the detector unit is at least one of a barcode scanner and radio frequency identification (RFID) reader.

6. The method of claim 1, wherein the short-range communication interface is at least one of a Bluetooth interface, a universal serial bus (USB) interface, a serial interface, an Ethernet interface, a near field communication (NFC) interface, or a general purpose input/output (GPIO) interface.

7. The method of claim 1, wherein the wireless communication network is at least one of a wireless fidelity (Wi-Fi) network and a cellular network.

8. The method of claim 1, wherein the wireless communication network is configured as a secure local area network (LAN).

9. The method of claim 8, wherein the configuration information includes a security certificate to authenticate with the secure LAN.

10. The method of claim 1, wherein the configuration information includes at least one of a network name for the wireless communication network, a network password for the wireless communication network, or a software update for the detector unit.

11. A method for securely provisioning a detector unit, the method comprising:

detecting, via a short-range communication interface, a coupling between a mobile computing device terminal and a detector unit, the mobile computing device terminal being attachable to the detector unit via a mechanical adapter coupled to the detector unit such that a top surface of the detector unit is adjacent to a bottom surface of the mechanical adapter and a top surface of the mechanical adapter is adjacent to a bottom surface of the mobile computing device terminal;

responsive to the coupling, obtaining, via one or more processors, identification information uniquely identifying the detector unit;

comparing, by the one or more processors, the identification information to a list of identification information for devices authorized to use a wireless communication network;

determining, via the one or more processors, that the detector unit is an authorized device; and responsive to the determination, provisioning, via the short-range communication interface, the detector unit with configuration information that enables the detector unit to access the wireless communication network.

12. The method of claim 11, wherein communications via the short-range communication interface utilize a different communication protocol than communications over the wireless communication network.

13. The method of claim 11, wherein:

the identification information uniquely identifying the detector unit is at least one of a serial number and a media access control (MAC) address;

the list of identification information includes a list of approved serial numbers or MAC addresses; and to determine the access response, the access server is configured to compare at least one of the serial number and the MAC address to the list of approved serial numbers or MAC addresses.

14. The method of claim 11, wherein:

the detector unit is associated with a unique public key/private key pair;

the identification information uniquely identifying the detector unit includes a digital signature applied encrypted via the private key; and determining that the detector unit is an authorized device comprises decrypting the digital signature using the public key.

15. The method of claim 11, wherein the detector unit is at least one of a barcode scanner and radio frequency identification (RFID) reader.

16. The method of claim 11, wherein the short-range communication interface is at least one of a Bluetooth interface, a universal serial bus (USB) interface, a serial interface, an Ethernet interface, a near field communication (NFC) interface, or a general purpose input/output (GPIO) interface.

17. The method of claim 11, further comprising:

obtaining, from an access server, the list of identification information.

18. The method of claim 11, wherein the wireless communication network is at least one of a wireless fidelity (Wi-Fi) network and a cellular network.

19. The method of claim 11, wherein:

the wireless communication network is configured as a secure local area network (LAN); and the configuration information includes a security certificate to authenticate with the secure LAN.

20. The method of claim 11, wherein the configuration information includes at least one of a network name for the wireless communication network, a network password for the wireless communication network, or a software update for the detector unit.

* * * * *